US012657004B2

(12) United States Patent
Amaya et al.

(10) Patent No.: US 12,657,004 B2
(45) Date of Patent: Jun. 16, 2026

(54) COMPLEX MULTIPLICATION CIRCUIT

(71) Applicant: Mitsubishi Electric Corporation, Tokyo (JP)

(72) Inventors: Hideyuki Amaya, Tokyo (JP); Kazutoshi Kawaguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1016 days.

(21) Appl. No.: 17/790,833

(22) PCT Filed: Dec. 2, 2020

(86) PCT No.: PCT/JP2020/044792
§ 371 (c)(1),
(2) Date: Jul. 5, 2022

(87) PCT Pub. No.: WO2021/157172
PCT Pub. Date: Aug. 12, 2021

(65) Prior Publication Data
US 2023/0029006 A1 Jan. 26, 2023

(30) Foreign Application Priority Data
Feb. 6, 2020 (JP) ................................. 2020-018788

(51) Int. Cl.
*G06F 7/544* (2006.01)
*G06F 7/523* (2006.01)
*G06F 17/10* (2006.01)

(52) U.S. Cl.
CPC ............. *G06F 7/5443* (2013.01); *G06F 7/523* (2013.01); *G06F 17/10* (2013.01)

(58) Field of Classification Search
CPC ......... G06F 7/523; G06F 7/5443; G06F 17/10
See application file for complete search history.

(56) References Cited

U.S. PATENT DOCUMENTS 6,307,907 B1 10/2001 Kim
8,386,553 B1 * 2/2013 Langhammer ........ G06F 7/5324
708/622

(Continued)

FOREIGN PATENT DOCUMENTS

JP S5752959 A 3/1982
JP H1125071 A 1/1999

(Continued)

OTHER PUBLICATIONS

International Search Report (PCT/ISA/210) with translation and Written Opinion (PCT/ISA/237) mailed on Mar. 9, 2021, by the Japan Patent Office as the International Searching Authority for International Application No. PCT/JP2020/044792. (8 pages).

*Primary Examiner* — Michael D. Yaary
(74) *Attorney, Agent, or Firm* — BUCHANAN INGERSOLL & ROONEY P.C.

(57) ABSTRACT

A first multiplex circuit generates a first multiplex signal obtained by time-divisionally multiplexing a first real part and a first imaginary part of a first complex number. A second multiplex circuit generates a second multiplex signal obtained by time-divisionally multiplexing a second real part and a second imaginary part of a second complex number. A multiply-subtract operation circuit performs a multiply-subtract operation of the first and second multiplex signals. A third multiplex circuit generates a third multiplex signal obtained by time-divisionally multiplexing the first and second real parts. A fourth multiplex circuit generates a fourth multiplex signal obtained by time-divisionally multiplexing the first and second imaginary parts. A multiply-accumulate operation circuit performs a multiply-accumulate operation of the third and fourth multiplex signals. A fifth multiplex circuit generates a fifth multiplex signal obtained by time-divisionally multiplexing output values of (Continued)

the multiply-subtract operation circuit and the multiply-accumulate operation circuit.

10 Claims, 9 Drawing Sheets

(56) References Cited

U.S. PATENT DOCUMENTS

| 8,572,153 B1 * | 10/2013 | New ....................... G06F 7/523 |
| | | 708/622 |
| 2007/0192399 A1 * | 8/2007 | Krithivasan .......... G06F 7/5338 |
| | | 708/620 |
| 2010/0039998 A1 | 2/2010 | Imamura et al. |
| 2010/0191786 A1 * | 7/2010 | Simkins ........... H03K 19/17732 |
| | | 708/322 |

FOREIGN PATENT DOCUMENTS

| JP | 2003076673 A | 3/2003 |
| JP | 2019083556 A | 5/2019 |

* cited by examiner

COMPLEX MULTIPLICATION CIRCUIT

TECHNICAL FIELD

The present disclosure relates to a complex multiplication circuit.

BACKGROUND ART

In a digital signal processing circuit, a large number of complex multiplication circuits are used to execute various processing such as correlation detection, phase rotation, and detection. The complex multiplication circuit basically includes four multipliers, one adder, and one subtractor (see, for example, Japanese Patent Laying-Open No. 2019-83556 (PTL 1)).

CITATION LIST

Patent Literature

PTL 1: Japanese Patent Laying-Open No. 2019-83556

SUMMARY OF INVENTION

Technical Problem

In general, since a multiplier has larger hardware than an adder and a subtractor, mounting a large number of complex multiplication circuits is a dominant factor that increases a circuit scale, power consumption, and cost of a large-scale integrated circuit (LSI).

In PTL 1, complex multiplication of a complex number X and a complex number C and complex multiplication of a complex conjugate of complex number X and complex number C are executed by sharing a single complex multiplication circuit. However, four multipliers are still built in the complex multiplication circuit, and there is room for improvement in reducing the circuit scale.

The present disclosure has been made to solve the above problem, and an object of the present disclosure is to provide a complex multiplication circuit capable of reducing a circuit scale.

Solution to Problem

A complex multiplication circuit according to the present disclosure multiplies a first complex number and a second complex number. The first complex number has a first real part and a first imaginary part. The second complex number has a second real part and a second imaginary part. A complex multiplication circuit includes a first multiplex circuit to generate a first multiplex signal obtained by time-divisionally multiplexing the first real part and the first imaginary part, a second multiplex circuit to generate a second multiplex signal obtained by time-divisionally multiplexing the second real part and the second imaginary part, a multiply-subtract operation circuit to perform a multiply-subtract operation of the first multiplex signal and the second multiplex signal, a third multiplex circuit to generate a third multiplex signal obtained by time-divisionally multiplexing the first real part and the second real part, a fourth multiplex circuit to generate a fourth multiplex signal obtained by time-divisionally multiplexing the second imaginary part and the first imaginary part, a multiply-accumulate operation circuit to perform a multiply-accumulate operation of the third multiplex signal and the fourth multiplex signal, and a fifth multiplex circuit to generate a fifth multiplex signal obtained by time-divisionally multiplexing an output value of the multiply-subtract operation circuit and an output value of the multiply-accumulate operation circuit.

Advantageous Effects of Invention

The present disclosure can provide a complex multiplication circuit capable of reducing a circuit scale.

DESCRIPTION OF EMBODIMENTS

Figure 1:
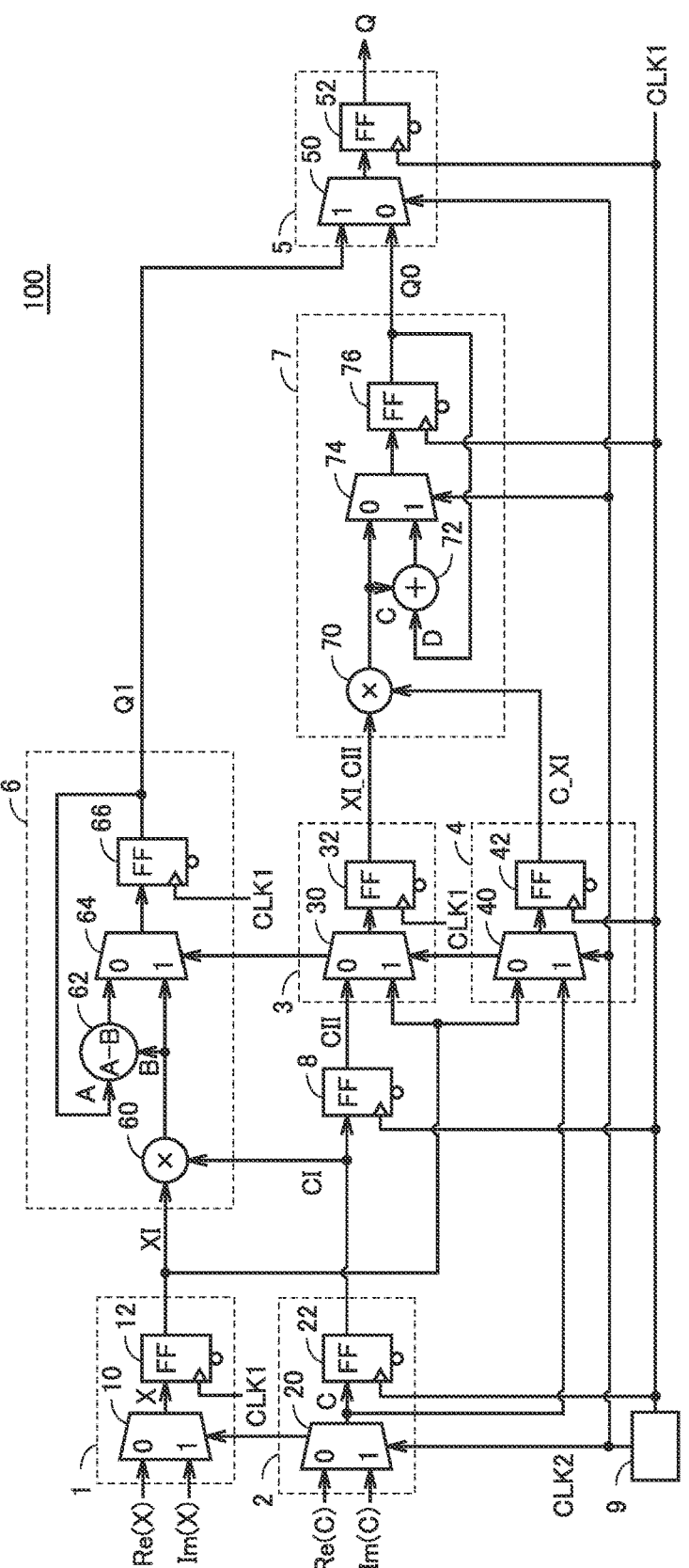
FIG. 1 is a diagram illustrating a configuration of a complex multiplication circuit according to a first embodiment.

Hereinafter, embodiments of the present disclosure will be described in detail with reference to the drawings. In the following description, the same or corresponding parts in the drawings are denoted by the same reference signs, and the description thereof will not be repeated in principle.

First Embodiment

<Configuration of Complex Multiplication Circuit>

FIG. 1 is a diagram illustrating a configuration of a complex multiplication circuit according to a first embodiment. The complex multiplication circuit according to the first embodiment is configured to receive inputs of two complex numbers and output a value obtained by multiplying the two complex numbers.

As illustrated in FIG. 1, a complex multiplication circuit 100 according to the first embodiment receives inputs of a first input signal X and a second input signal C. First input signal X is a complex number and is represented by a real part $Re(X)$ and an imaginary part $Im(X)$ as $X=Re(X)+Im(X)i$ (i is an imaginary unit). First input signal X changes in the order of $X_0$, $X_1$, $X_2$, . . . at a predetermined cycle at a cycle set in advance. Second input signal C is a complex number and is represented by a real part $Re(C)$ and an imaginary part $Im(C)$ as $C=Re(C)+Im(C)i$. Second input signal C changes in the order of $C_0$, $C_1$, $C_2$, . . . in synchronization with first input signal X. Complex multiplication circuit 100 multiplies first input signal X and second input signal C and outputs a signal Q ($=XC$) which is a multiplication value. First input signal X corresponds to an example of a "first complex number", and second input signal C corresponds to an example of a "second complex number".

Specifically, complex multiplication circuit 100 includes multiplex circuits 1 to 5, a multiply-subtract operation circuit 6, a multiply-accumulate operation circuit 7, a flip-flop 8, and a clock generation circuit 9.

Multiplex circuit 1 receives real part Re(X) of first input signal X and imaginary part Im(X) of first input signal X. Multiplex circuit 1 time-divisionally multiplexes input real part Re(X) and imaginary part Im(X) and outputs a multiplex signal XI.

Specifically, multiplex circuit 1 includes a selector 10 and a flip-flop 12. Selector 10 receives inputs of real part Re(X) and imaginary part Im(X). Selector 10 time-divisionally multiplexes real part Re(X) and imaginary part Im(X) in accordance with a logic (rise and fall) of a second clock signal CLK2, and outputs multiplex signal X. Multiplex circuit 1 corresponds to an example of a "first multiplex circuit".

Second clock signal CLK2 is generated by clock generation circuit 9. Clock generation circuit 9 receives a first clock signal CLK1 having a frequency f [Hz]. Frequency f [Hz] of first clock signal CLK1 corresponds to twice a frequency of input signals X and C. Clock generation circuit 9 divides frequency of first clock signal CLK1 having frequency f [Hz] to generate second clock signal CLK2 having a frequency f/2 [Hz].

Selector 10 outputs imaginary part Im(X) at a timing of a rise of second clock signal CLK2 and outputs real part Re(X) at a timing of a fall of second clock signal CLK2. That is, real part Re(X) and imaginary part Im(X) alternately appear in multiplex signal X output from selector 10 at the same cycle as first clock signal CLK1. Flip-flop 12 receives multiplex signal X output from selector 10 and receives first clock signal CLK1. Flip-flop 12 is a D flip-flop, delays the input signal (multiplex signal X) by one cycle of first clock signal CLK1, and outputs multiplex signal XI.

A multiplex circuit 2 receives real part Re(C) of second input signal C and imaginary part Im(C) of second input signal C. Multiplex circuit 2 time-divisionally multiplexes input real part Re(C) and imaginary part Im(C) and outputs a multiplex signal CI. Multiplex circuit 2 corresponds to an example of a "second multiplex circuit".

Specifically, multiplex circuit 2 includes a selector 20 and a flip-flop 22. Selector 20 receives inputs of real part Re(C) and imaginary part Im(C). Selector 20 time-divisionally multiplexes real part Re(C) and imaginary part Im(C) in accordance with the logic of second clock signal CLK2, and outputs multiplex signal C. Selector 20 outputs imaginary part Im(C) at a timing of a rise of second clock signal CLK2 and outputs real part Re(C) at a timing of a fall of second clock signal CLK2. That is, real part Re(C) and imaginary part Im(C) alternately appear in multiplex signal C output from selector 20 at the same cycle as first clock signal CLK1. Flip-flop 22 is a D flip-flop, delays the input signal (multiplex signal C) by one cycle of first clock signal CLK1, and outputs multiplex signal CI.

Multiply-subtract operation circuit 6 receives multiplex signal XI from multiplex circuit 1 and receives multiplex signal CI from multiplex circuit 2. Multiply-subtract operation circuit 6 multiplies multiplex signal XI and multiplex signal CI in synchronization with first clock signal CLK1. Multiply-subtract operation circuit 6 further time-divisionally multiplexes a multiplication value B acquired in a current cycle and a value A–B obtained by subtracting multiplication value B from a multiplication value A acquired in a previous cycle, and outputs a multiplex signal Q1. Multiply-subtract operation circuit 6 corresponds to an example of a "multiply-accumulate operation circuit".

Specifically, multiply-subtract operation circuit 6 includes a multiplier 60, a subtractor 62, a selector 64, and a flip-flop 66. Multiplier 60 multiplies multiplex signal XI and multiplex signal CI and outputs multiplication value B (=CIXI). An output signal B of multiplier 60 is input to subtractor 62 and selector 64. Multiplier 60 corresponds to an example of a "first multiplier".

Subtractor 62 receives output signal B of multiplier 60 and an output signal A of flip-flop 66. Subtractor 62 subtracts output signal B from output signal A and outputs a subtraction value A–B. Output signal A–B of subtractor 62 is input to selector 64. Subtractor 62 corresponds to an example of a "subtractor".

Selector 64 receives output signal B of multiplier 60 and output signal A–B of subtractor 62. Selector 64 time-divisionally multiplexes these two input signals in accordance with the logic of second clock signal CLK2 and outputs a multiplex signal. Specifically, selector 64 outputs output signal B of multiplier 60 at a timing of a rise of second clock signal CLK2 and outputs output signal A–B of subtractor 62 at a timing of a fall of second clock signal CLK2. That is, multiplication value B and subtraction value A–B alternately appear in the multiplex signal output from selector 64 at the same cycle as first clock signal CLK1. Flip-flop 66 is a D flip-flop, delays the input signal (output signal of selector 64) by one cycle of first clock signal CLK1, and outputs multiplex signal Q1.

Flip-flop 8 is a D flip-flop, delays the input signal multiplex signal CI input by multiplex circuit 2 by one cycle of first clock signal CLK1, and outputs a multiplex signal CII.

Multiplex circuit 3 receives multiplex signal XI from multiplex circuit 1 and receives multiplex signal CII from flip-flop 8. Multiplex circuit 3 time-divisionally multiplexes input multiplex signal XI and multiplex signal CII and outputs a multiplex signal XI_CII. Specifically, multiplex circuit 3 includes a selector 30 and a flip-flop 32.

Selector 30 receives inputs of multiplex signal XI and multiplex signal CII. Selector 30 time-divisionally multiplexes multiplex signal XI and multiplex signal CII in accordance with the logic of second clock signal CLK2 and outputs a multiplex signal. Specifically, selector 30 outputs multiplex signal XI at a timing of a rise of second clock signal CLK2 and outputs multiplex signal CII at a timing of a fall of second clock signal CLK2. That is, multiplex signal XI and multiplex signal CII alternately appear in the multiplex signal output from selector 30 at the same cycle as first clock signal CLK1. Flip-flop 32 is a D flip-flop, delays the input signal from selector 30 by one cycle of first clock signal CLK1, and outputs multiplex signal XI_CII. Flip-flop 8 and multiplex circuit 3 correspond to an example of a "third multiplex circuit".

Multiplex circuit 4 receives multiplex signal C from multiplex circuit 2 and receives multiplex signal XI from multiplex circuit 1. Multiplex circuit 4 time-divisionally multiplexes input multiplex signal C and multiplex signal XI and outputs a multiplex signal C_XI. Specifically, multiplex circuit 4 includes a selector 40 and a flip-flop 42.

Selector 40 receives inputs of multiplex signal XI and multiplex signal C. Selector 40 time-divisionally multiplexes multiplex signal C and multiplex signal XI in accordance with the logic of second clock signal CLK2 and outputs a multiplex signal. Specifically, selector 40 outputs multiplex signal C at a timing of a rise of second clock signal CLK2 and outputs multiplex signal XI at a timing of a fall of second clock signal CLK2. That is, multiplex signal C and multiplex signal XI alternately appear in the multiplex signal output from selector 40 at the same cycle as first clock signal CLK1. Flip-flop 42 is a D flip-flop, delays the input signal from selector 40 by one cycle of first clock signal CLK1, and outputs multiplex signal C_XI. Multiplex circuit 4 corresponds to an example of a "fourth multiplex circuit".

Multiply-accumulate operation circuit 7 receives multiplex signal XI_CII from multiplex circuit 3 and receives multiplex signal C_XI from multiplex circuit 4. Multiply-accumulate operation circuit 7 multiplies multiplex signal XI_CII and multiplex signal C_XI in synchronization with first clock signal CLK1. Multiply-accumulate operation circuit 7 further time-divisionally multiplexes a multiplication value C acquired in the current cycle and a value C+D obtained by adding a multiplication value D acquired in the previous cycle and multiplication value C, and outputs a multiplex signal Q0. Multiply-accumulate operation circuit 7 corresponds to an example of a "multiply-accumulate operation circuit".

Specifically, multiply-accumulate operation circuit 7 includes a multiplier 70, an adder 72, a selector 74, and a flip-flop 76. Multiplier 70 multiplies multiplex signal XI_CII and multiplex signal C_XI and outputs multiplication value C (=XI_CII·C_XI). An output signal C of multiplier 70 is input to adder 72 and selector 74. Multiplier 70 corresponds to an example of a "second multiplier".

Adder 72 receives output signal C of multiplier 70 and an output signal D of flip-flop 76. Adder 72 adds output signal C and output signal D and outputs an addition result C+D. Output signal C+D of adder 72 is input to selector 74. Adder 72 corresponds to an example of an "adder".

Selector 74 receives output signal C of multiplier 70 and output signal C+D of adder 72. Selector 74 time-divisionally multiplexes these two input signals in accordance with the logic of second clock signal CLK2 and outputs a multiplex signal. Specifically, selector 74 outputs output signal C+D of adder 72 at a timing of a rise of second clock signal CLK2 and outputs output signal C of multiplier 70 at a timing of a fall of second clock signal CLK2. That is, an addition value C+D and multiplication value C alternately appear in the multiplex signal output from selector 74 at the same cycle as first clock signal CLK1. Flip-flop 76 is a D flip-flop, delays the input signal (output signal of selector 74) by one cycle of first clock signal CLK1, and outputs multiplex signal Q0.

Multiplex circuit 5 receives multiplex signal Q1 from multiply-subtract operation circuit 6 and receives multiplex signal Q0 from multiply-accumulate operation circuit 7. Multiplex circuit 5 time-divisionally multiplexes input multiplex signal Q1 and multiplex signal Q0 and outputs a multiplex signal Q. Multiplex circuit 5 corresponds to an example of a "fifth multiplex circuit".

Specifically, multiplex circuit 5 includes a selector 50 and a flip-flop 52. Upon receipt of inputs of multiplex signal Q1 and multiplex signal Q0, selector 50 time-divisionally multiplexes multiplex signal Q1 and multiplex signal Q0 in accordance with the logic of second clock signal CLK2 and outputs a multiplex signal. Specifically, selector 50 outputs multiplex signal Q1 at a timing of a rise of second clock signal CLK2 and outputs multiplex signal Q0 at a timing of a fall of second clock signal CLK2. That is, multiplex signal Q1 and multiplex signal Q0 alternately appear in the multiplex signal output from selector 50 at the same cycle as first clock signal CLK1. Flip-flop 52 is a D flip-flop, delays the input signal from selector 50 by one cycle of first clock signal CLK1, and outputs multiplex signal Q. Multiplex signal Q is an output signal of complex multiplication circuit 100 and corresponds to a multiplication value of first input signal X and second input signal C which are complex numbers.

<Operation of Complex Multiplication Circuit>

Next, description will be made of an operation of complex multiplication circuit 100 according to the first embodiment.

Figure 2:
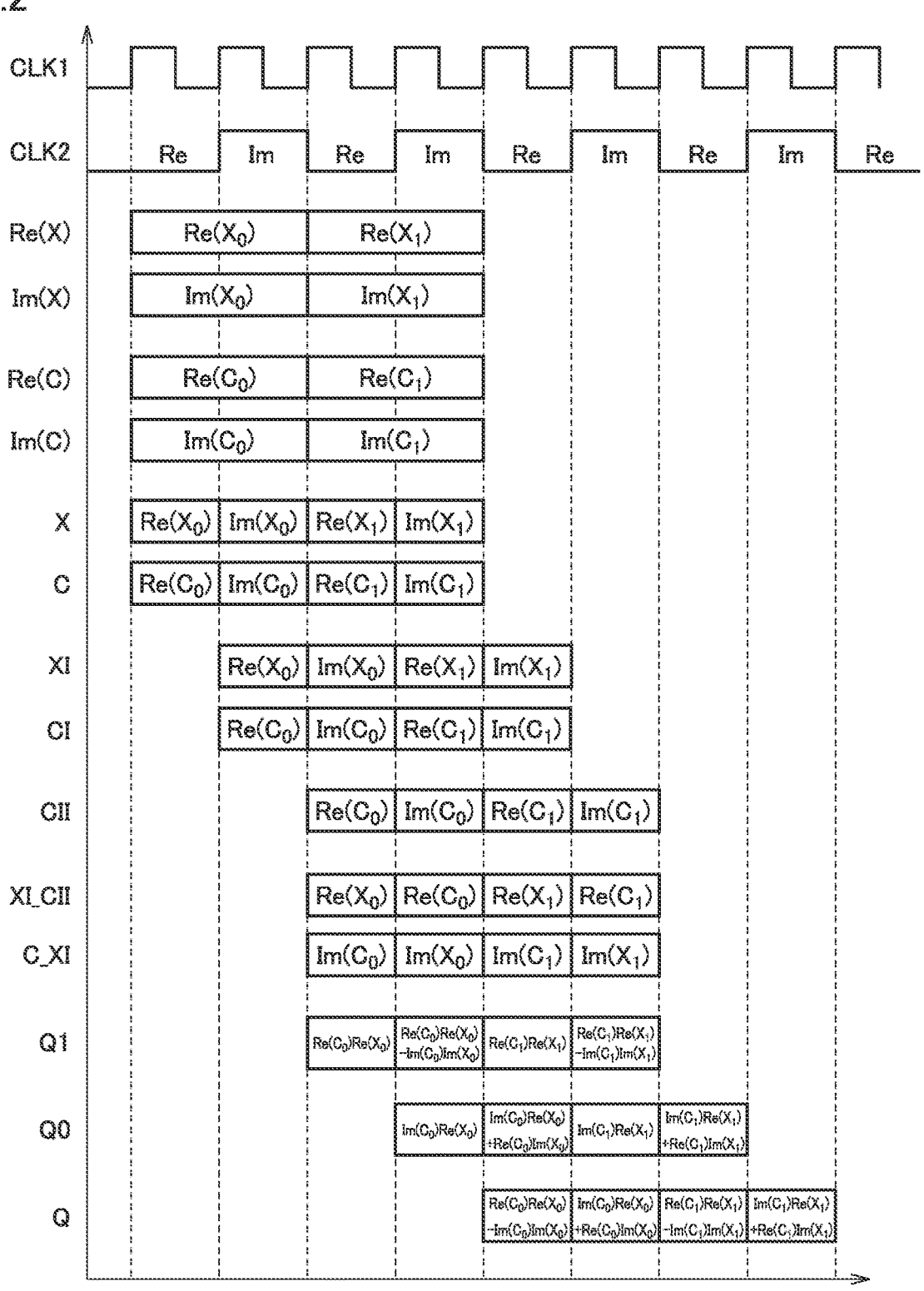
FIG. 2 is a time chart illustrating an operation of the complex multiplication circuit illustrated in FIG. 1.
Figure 3:
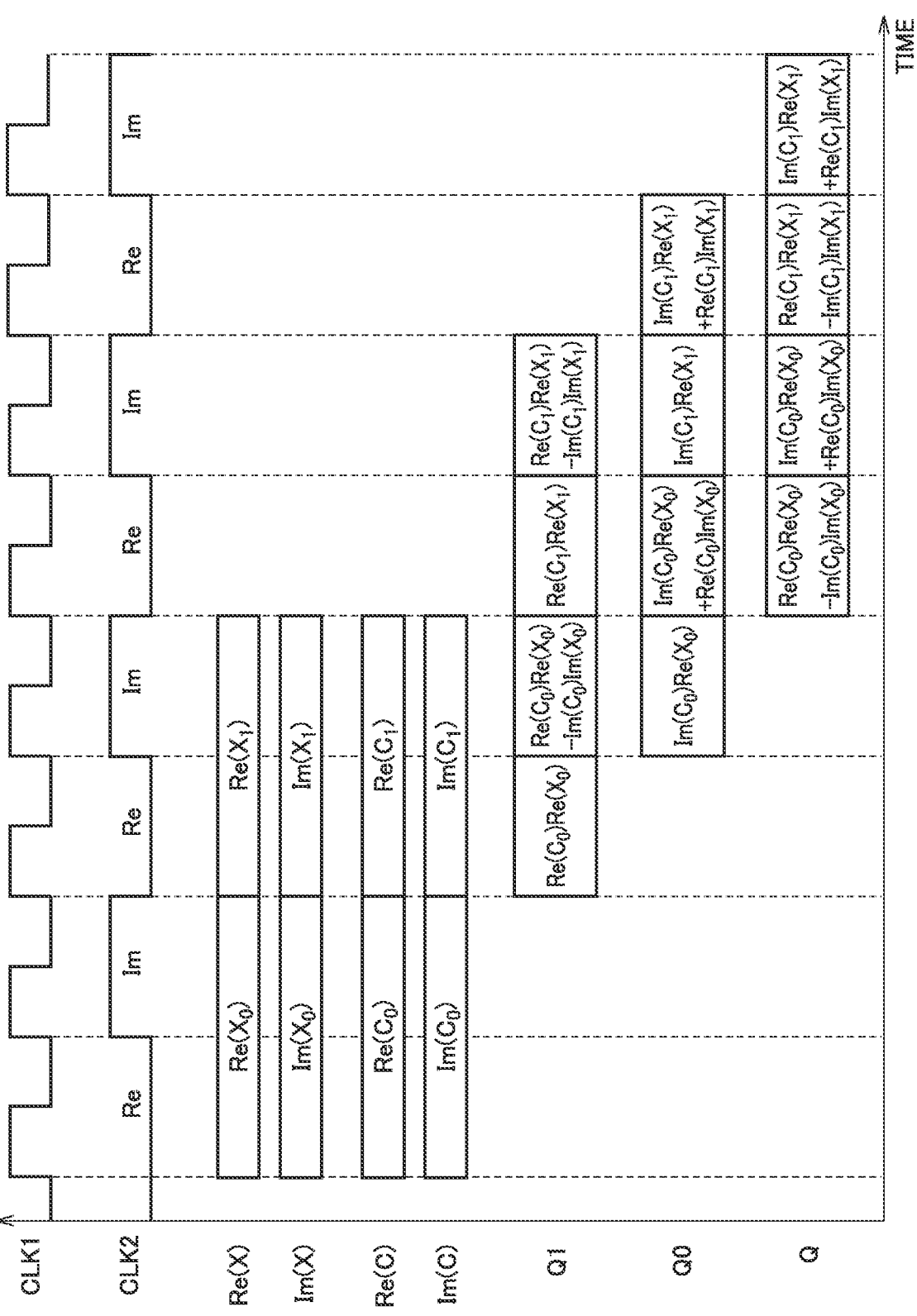
FIG. 3 is a time chart illustrating an operation of the complex multiplication circuit illustrated in FIG. 1.

FIGS. 2 and 3 are time charts illustrating the operation of complex multiplication circuit 100 illustrated in FIG. 1. FIG. 2 illustrates, in order from the top, waveforms of first clock signal CLK1, second clock signal CLK2, real part Re(X) and imaginary part Im(X) of first input signal X, and real part Re(C) and imaginary part Im(C) of second input signal C. FIG. 2 also illustrates waveforms of multiplex signal X and multiplex signal XI generated in multiplex circuit 1, multiplex signal C and multiplex signal CI generated in multiplex circuit 2, multiplex signal CII generated in flip-flop 8, multiplex signal XI_CII generated in multiplex circuit 3, and multiplex signal C_XI generated in multiplex circuit 4. FIG. 2 further illustrates waveforms of multiplex signal Q1 generated by multiply-subtract operation circuit 6, multiplex signal Q0 generated by multiply-accumulate operation circuit 7, and multiplex signal Q generated by multiplex circuit 5. FIG. 3 illustrates waveforms of clock signals CLK1 and CLK2, real part Re(X) and imaginary part Im(X) of first input signal X, real part Re(C) and imaginary part Im(C) of second input signal C, and multiplex signals Q1, Q0, and Q extracted from the time chart in FIG. 2.

As illustrated in FIG. 2, first input signal X is a complex number $X_n$ (n is an integer of 0 or more) and has a real part Re $(X_n)$ and an imaginary part Im $(X_n)$. Second input signal C is a complex number $C_n$ and has a real part Re $(C_n)$ and an imaginary part Im $(C_n)$. First input signal X changes in the order of $X_0$, $X_1$, $X_2$, . . . at a predetermined cycle. Therefore, the real part Re(X) changes in the order of Re($X_0$), Re($X_1$), Re($X_2$), . . . , and imaginary part Im(X) changes in the order of Im($X_0$), Im($X_1$), Im($X_2$), . . . .

Second input signal C changes in the order of $C_0$, $C_1$, $C_2$, . . . in synchronization with first input signal X. Therefore, real part Re(C) changes in the order of Re($C_0$), Re($C_1$), Re($C_2$), . . . , and imaginary part Im(C) changes in the order of Im($C_0$), Im($C_1$), Im($C_2$), . . . .

First clock signal CLK1 has frequency f [Hz] that is twice the frequency of first input signal X and second input signal C. Second clock signal CLK2 has frequency f/2 [Hz]. First clock signal CLK1 is provided to flip-flops 8, 12, 22, 32, 42, 52, 66, and 76. Second clock signal CLK2 is provided to selectors 10, 20, 30, 40, 50, 64, and 74.

In multiplex circuit 1, upon receipt of inputs of real part Re(X) and imaginary part lm (X) of first input signal, selector 10 outputs real part Re(X) at a timing of a fall of second clock signal CLK2 and outputs imaginary part Im(X) at a timing of a rise of second clock signal CLK2. Therefore, multiplex signal X output from selector 10 changes in the order of real part Re($X_0$), imaginary part Im($X_0$), real part Re($X_1$), imaginary part Im($X_1$), . . . in synchronization with first clock signal CLK1. That is, real part Re(X) and imaginary part Im(X) alternately appear in multiplex signal X in synchronization with first clock signal CLK1. Flip-flop 12 outputs multiplex signal XI obtained by delaying multiplex signal X by one cycle of first clock signal CLK1.

In multiplex circuit 2, upon receipt of inputs of real part Re(C) and imaginary part lm (C) of second input signal, selector 20 outputs real part Re(C) at a timing of a fall of second clock signal CLK2 and outputs imaginary part Im(C) at a timing of a rise of second clock signal CLK2. Therefore, multiplex signal C output from selector 20 changes in the order of real part $Re(C_0)$, imaginary part $Im(C_0)$, real part $Re(C_1)$, imaginary part $Im(C_1)$, . . . in synchronization with first clock signal CLK1. That is, real part $Re(C)$ and imaginary part $Im(C)$ alternately appear in multiplex signal C in synchronization with first clock signal CLK1. Flip-flop 22 outputs multiplex signal CI obtained by delaying multiplex signal C by one cycle of first clock signal CLK1.

Flip-flop 8 outputs multiplex signal CII obtained by further delaying multiplex signal CI provided from multiplex circuit 2 by one cycle of first clock signal CLK1.

In multiplex circuit 3, upon receipt of inputs of multiplex signal XI and multiplex signal CII, selector 30 outputs multiplex signal CII at a timing of a fall of second clock signal CLK2 and outputs multiplex signal XI at a timing of a rise of second clock signal CLK2. Thus, multiplex signal XI and multiplex signal CII alternately appear in the multiplex signal output from selector 30 in synchronization with first clock signal CLK1. Flip-flop 32 outputs multiplex signal XI_CII obtained by delaying the output signal of selector 30 by one cycle of first clock signal CLK1. As illustrated in FIG. 2, multiplex signal XI_CII changes in the order of multiplex signal XI (=real part $Re(X_0)$), multiplex signal CII (=real part $Re(C_0)$), multiplex signal XI (=real part $Re(X_1)$), multiplex signal CII (=real part $Re(C_1)$), . . . in synchronization with first clock signal CLK1. That is, multiplex signal XI_CII is a multiplex signal obtained by time-divisionally multiplexing real part $Re(X)$ of first input signal X and real part $Re(C)$ of second input signal C.

In multiplex circuit 4, upon receipt of inputs of multiplex signal C and multiplex signal XI, selector 40 outputs multiplex signal XI at a timing of a fall of second clock signal CLK2 and outputs multiplex signal C at a timing of a rise of second clock signal CLK2. Thus, multiplex signal C and multiplex signal XI alternately appear in the multiplex signal output from selector 40 in synchronization with first clock signal CLK1. Flip-flop 42 outputs multiplex signal C_XI obtained by delaying the output signal of selector 40 by one cycle of first clock signal CLK1. As illustrated in FIG. 2, multiplex signal C_XI changes in the order of multiplex signal C (=imaginary part $Im(C_0)$), multiplex signal XI (=imaginary part $Im(X_0)$), multiplex signal C (=imaginary part $Im(C_1)$), multiplex signal XI (=imaginary part $Im(X_1)$), . . . in synchronization with first clock signal CLK1. That is, multiplex signal C_XI is a multiplex signal obtained by time-divisionally multiplexing imaginary part $Im(C)$ of second input signal C and imaginary part $Im(X)$ of first input signal X.

Multiply-subtract operation circuit 6 receives inputs of multiplex signal XI and multiplex signal CI. As described above, multiplex signal XI is a multiplex signal obtained by time-divisionally multiplexing real part $Re(X)$ and imaginary part $Im(X)$ of first input signal X. Multiplex signal CI is a multiplex signal obtained by time-divisionally multiplexing real part $Re(C)$ and imaginary part $Im(C)$ of second input signal C.

In multiply-subtract operation circuit 6, multiplier 60 multiplies multiplex signal XI and multiplex signal CI in synchronization with first clock signal CLK1. In multiplication value B of multiplier 60, a multiplication value of real part $Re(X)$ and real part $Re(C)$ and a multiplication value of imaginary part $Im(X)$ and imaginary part $Im(C)$ alternately appear in synchronization with first clock signal CLK1. Subtractor 62 subtracts multiplication value B acquired in the current cycle from multiplication value A acquired in the previous cycle.

Selector 64 outputs multiplication value B of multiplier 60 at a timing of a rise of second clock signal CLK2 and outputs subtraction value A−B of subtractor 62 at a timing of a fall of second clock signal CLK2. Multiplication value B and subtraction value A−B alternately appear in the multiplex signal output from selector 64 at the same cycle as first clock signal CLK1. Flip-flop 66 outputs multiplex signal Q1 obtained by delaying the input signal (output signal of selector 64) by one cycle of first clock signal CLK1.

As illustrated in FIGS. 2 and 3, multiplex signal Q1 changes in the order of a multiplication value $[Re(C_0) Re(X_0)]$ of real part $Re(C_0)$ and real part $Re(X_0)$, a value $\{Re(C_0) Re(X_0)−Im(C_0) Im(X_0)\}$ obtained by subtracting a multiplication value $[Im(C_0) Im(I_0)]$ of imaginary part $Im(C_0)$ and imaginary part $Im(X_0)$ from multiplication value $[Re(C_0) Re(X_0)]$, a multiplication value $[Re(C_1) Re(X_1)]$ of real part $Re(X_1)$ and real part $Re(C_1)$, a value $\{[Re(C_1) Re(X_1)]−Im(C_1) Im(X_1)\}$ obtained by subtracting a multiplication value $[Im(X_1) Im(C_1)]$ of imaginary part $Im(C_1)$ and imaginary part $Im(C_1)$ from multiplication value $[Re(C_1) Re(X_1)]$, . . . in synchronization with first clock signal CLK1. That is, multiplex signal Q1 is a multiplex signal obtained by time-divisionally multiplexing a multiplication value $[Re(C) Re(X)]$ of real part $Re(C)$ and real part $Re(X)$ and a value $\{Re(C) Re(X)−Im(C) Im(X)\}$ obtained by subtracting a multiplication value of imaginary part $Im(C)$ and imaginary part $Im(X)$ from the multiplication value of real part $Re(C)$ and real part $Re(X)$.

Multiply-accumulate operation circuit 7 receives inputs of multiplex signal XI_CII and multiplex signal C_XI. As described above, multiplex signal XI_CII is a multiplex signal obtained by time-divisionally multiplexing real part $Re(X)$ of first input signal X and real part $Re(C)$ of second input signal C. Multiplex signal C_XI is a multiplex signal obtained by time-divisionally multiplexing imaginary part $Im(C)$ of second input signal C and imaginary part $Im(X)$ of first input signal X.

In multiply-accumulate operation circuit 7, multiplier 70 multiplies multiplex signal XI_CII and multiplex signal C_XI in synchronization with first clock signal CLK1. In multiplication value C of multiplier 70, a multiplication value of imaginary part $Im(C)$ and real part $Re(X)$ and a multiplication value of real part $Re(C)$ and imaginary part $Im(X)$ alternately appear in synchronization with first clock signal CLK1. Adder 72 adds multiplication value D acquired in the previous cycle and multiplication value C acquired in the current cycle.

Selector 74 outputs multiplication value C of multiplier 70 at a timing of a fall of second clock signal CLK2 and outputs addition value C+D at a timing of a rise of second clock signal CLK2. Multiplication value C and addition value C+D alternately appear in the multiplex signal output from selector 74 at the same cycle as first clock signal CLK1. Flip-flop 76 outputs multiplex signal Q0 obtained by delaying the input signal (output signal of selector 74) by one cycle of first clock signal CLK1.

As illustrated in FIGS. 2 and 3, multiplex signal Q0 changes in the order of a multiplication value $[Im(C_0) Re(X_0)]$ of imaginary part $Im(C_0)$ and real part $Re(X_0)$, a value $\{Im(C_0) Re(X_0)+Re(C_0) Im(X_0)\}$ obtained by adding multiplication value $[Re(C_0) Im(X_0)]$ of real part $Re(C_0)$ and imaginary part $Im(X_0)$ to a multiplication value $[Im(C_0) Re(X_0)]$, a multiplication value $[Im(C_1) Re(X_1)]$ of imaginary part $Im(C_1)$ and real part $Re(X_1)$, a value $\{Im(C_1) Re(X_1)+Re(C_1) Im(X_1)\}$ obtained by adding a multiplication value $[Re(C_1) Im(X_1)]$ of real part $Re(C_1)$ and imaginary part $Im(X_1)$ to multiplication value $[Im(C_1) Re(X_1)]$, . . . in synchronization with first clock signal CLK1. That is, multiplex signal Q0 is a multiplex signal obtained by time-divisionally multiplexing a multiplication value [Im(C) Re(X)] of imaginary part Im(C) and real part Re(X) and a value {Im(C) Re(X)+Re(C) Im(X)} obtained by adding the multiplication value of imaginary part Im(C) and real part Re(X) and a multiplication value of real part Re(C) and imaginary part Im(X).

Note that multiplex signal Q0 is delayed from multiplex signal Q1 by one cycle of first clock signal CLK1. This is because multiplex signals XI_CII and C_XI input to multiply-accumulate operation circuit 7 are delayed from multiplex signals XI and CI input to multiply-subtract operation circuit 6 by one cycle of first clock signal CLK1.

In multiplex circuit 5, upon receipt of inputs of multiplex signal Q1 and multiplex signal Q0, selector 50 outputs multiplex signal Q0 at a timing of a fall of second clock signal CLK2 and outputs multiplex signal Q1 at a timing of a rise of second clock signal CLK2. Thus, multiplex signal Q1 and multiplex signal Q0 alternately appear in the multiplex signal output from selector 50 in synchronization with first clock signal CLK1. Flip-flop 52 outputs multiplex signal Q obtained by delaying the output signal of selector 50 by one cycle of first clock signal CLK1. As illustrated in FIGS. 2 and 3, multiplex signal Q changes in the order of multiplex signal Q1 (=subtraction value {Re($C_0$) Re($X_0$)−Im($C_0$) Im($X_0$)}), multiplex signal Q0 (=addition value {Im($C_0$) Re($X_0$)+Re($C_0$) Im($X_0$)}), multiplex signal Q1 (=subtraction value {Re($C_1$) Re($X_1$)−Im($C_1$) Im(X)}), and multiplex signal Q0 (=addition value {Im($C_1$) Re($X_1$)+Re($C_1$) Im(X)}), ... in synchronization with first clock signal CLK1.

That is, multiplex signal Q is a multiplex signal obtained by time-divisionally multiplexing the subtraction value {Re(C) Re(X)−Im(C) Im(X)} and the addition value {Im(C) Re(X)+Re(C) Im(X)}.

Here, when complex number X and complex number C are represented as the following equations (1) and (2), respectively (i is an imaginary unit), a multiplication value XC of complex number X and complex number C is represented as the following equation (3).

$$X=\mathrm{Re}(X)+\mathrm{Im}(X)i \tag{1}$$

$$C=\mathrm{Re}(C)+\mathrm{Im}(C)i \tag{2}$$

$$XC=\{\mathrm{Re}(X)\mathrm{Re}(C)-\mathrm{Im}(X)\mathrm{Im}(C)\}+\{\mathrm{Im}(C)\mathrm{Re}(X)+\mathrm{Re}(C)\mathrm{Im}(X)\}i \tag{3}$$

Comparing the right side of equation (3) with multiplex signal Q, the real part in the first term on the right side corresponds to the subtraction value in multiplex signal Q, and the imaginary part in the second term on the right side corresponds to the addition value in multiplex signal Q. That is, it can be seen that multiplex signal Q is a multiplex signal obtained by time-divisionally multiplexing the real part and the imaginary part of multiplication value XC of complex number X and complex number C.

As described above, the complex multiplication circuit according to the first embodiment is configured to convert each of two complex numbers X and C into multiplex signals XI and CI obtained by time-divisionally multiplexing the real part and the imaginary part, calculate two generated multiplex signals XI and CI, and output, as multiplication value XC, multiplex signal Q obtained by time-divisionally multiplexing the real part and the imaginary part. In the above configuration, the circuit that calculates two multiplex signals XI and CI can include two multipliers 60 and 70, one subtractor 62, and one adder 72.

Figure 4:
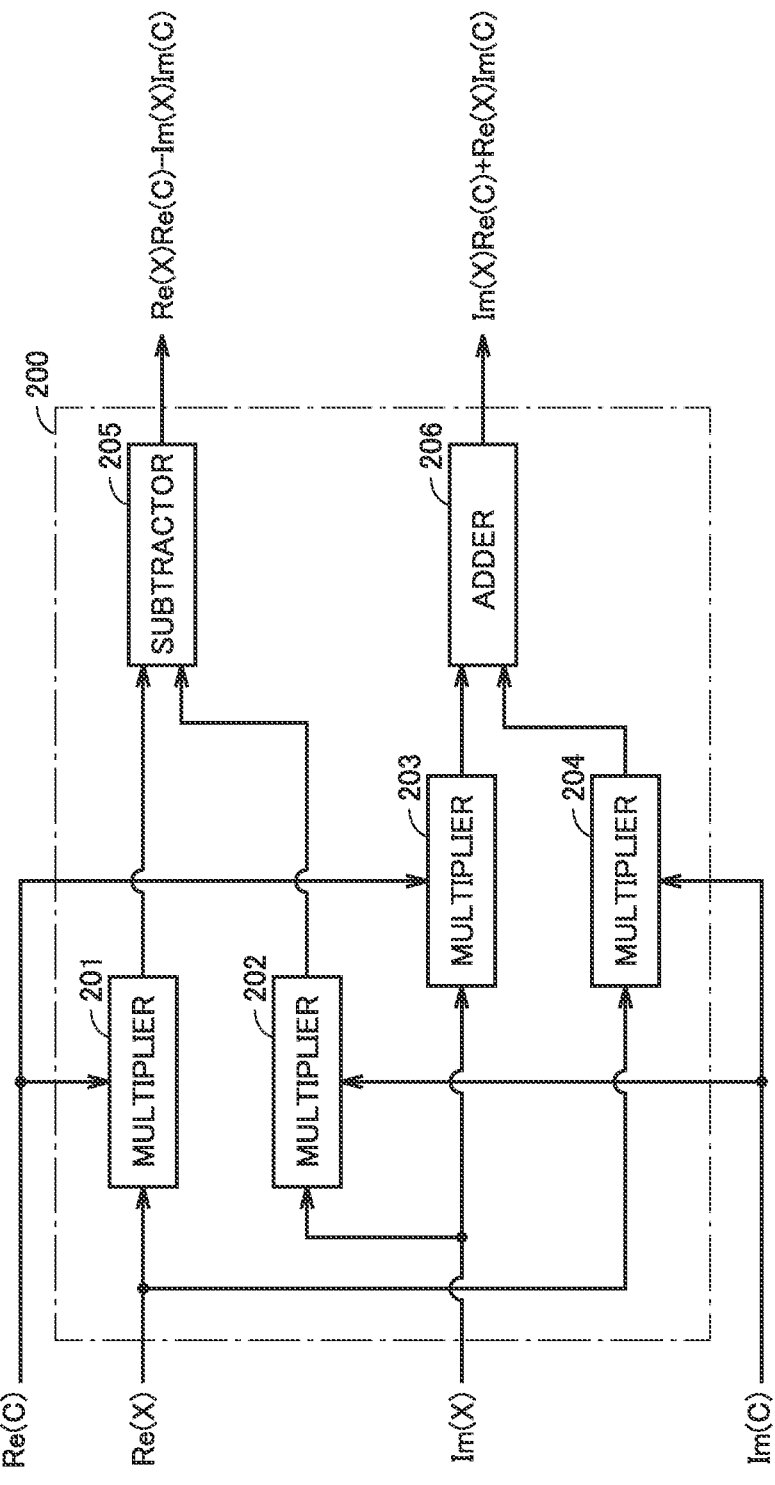
FIG. 4 is a diagram illustrating a configuration of a conventional complex multiplication circuit.

FIG. 4 is a diagram for comparison illustrating a configuration of a conventional complex multiplication circuit 200. Referring to FIG. 4, conventional complex multiplication circuit 200 includes four multipliers 201 to 204, one subtractor 205, and one adder 206 as a configuration for receiving inputs of complex number X and complex number C represented in equations (1) and (2) and outputting multiplication value XC represented in equation (3).

Multiplier 201 receives inputs of real part Re(X) of complex number X and real part Re(C) of complex number C and outputs a value Re(X) Re(C) obtained by multiplying these two inputs.

Multiplier 202 receives inputs of imaginary part Im(X) of complex number X and imaginary part Im(C) of complex number C and outputs a value Im(X) Im(C) obtained by multiplying these two inputs.

Multiplier 203 receives imaginary part Im(X) of complex number X and real part Re(C) of complex number C and outputs a value Im(X) Re(C) obtained by multiplying these two inputs.

Multiplier 204 receives inputs of real part Re(X) of complex number X and imaginary part Im(C) of complex number C and outputs a value Re(X) Im(C) obtained by multiplying these two inputs.

Subtractor 205 subtracts multiplication value Im(X) Im(C) of multiplier 202 from multiplication value Re(X) Re(C) of multiplier 201 and outputs a subtraction value {Re(X) Re(C)−Im(X) Im(C)}.

Adder 206 adds multiplication value Im(X) Re(C) of multiplier 203 and multiplication value Re(X) Im(C) of multiplier 204 and outputs an addition value {Im(X) Re(C)+Re(X) Im(C)}.

In conventional complex multiplication circuit 200 illustrated in FIG. 4, the subtraction value of subtractor 205 corresponds to the real part of multiplication value XC of complex number X and complex number C, and the addition value of adder 206 corresponds to the imaginary part of multiplication value XC. As described above, conventional complex multiplication circuit 200 employs a circuit configuration including four multipliers, one subtractor, and one adder. In the circuit configuration, the multipliers have larger hardware than the adder and the subtractor. Therefore, by mounting a large number of complex multiplication circuits for processing such as correlation detection, phase rotation, and detection, there is a concern that a circuit scale of an LSI increases and power consumption and cost increase.

Complex multiplication circuit 100 according to the first embodiment is configured to calculate a multiplex signal obtained by time-divisionally multiplexing a real part and an imaginary part of each of two complex numbers, and thus four multiplications necessary for complex multiplication can be executed by sharing two multipliers. As a result, the number of multipliers to be used can be reduced as compared with conventional complex multiplication circuit 200, and it is therefore possible to suppress an increase in size and cost of the LSI. It is also possible to suppress an increase in power consumption of the LSI.

Second Embodiment

Complex multiplication circuit 100 according to the first embodiment can be mounted on both a field programmable gate array (FPGA) and an application specific integrated circuit (ASIC). However, in complex multiplication circuit 100, each of multiply-subtract operation circuit 6 and multiply-accumulate operation circuit 7 is configured to be implementable by a digital signal processor (DSP)-dedicated circuit built in the FPGA.

Figure 5:
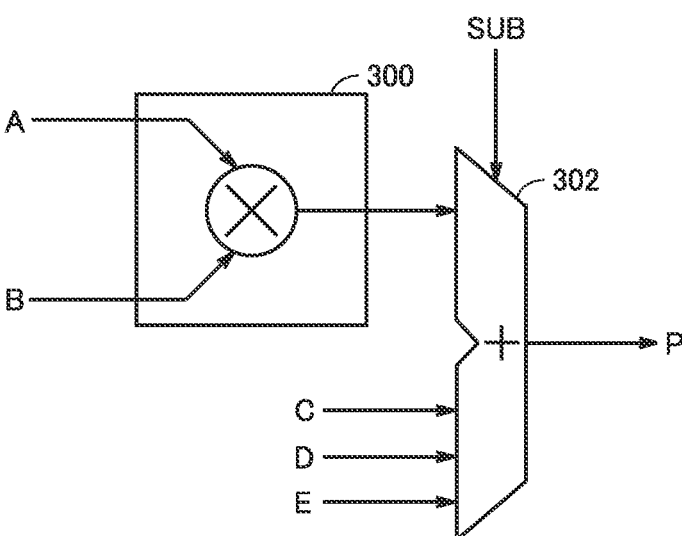
FIG. 5 is a diagram illustrating a configuration example of a general DSP-dedicated circuit built in an FPGA.

FIG. 5 is a diagram illustrating a configuration example of a general DSP-dedicated circuit built in the FPGA. As illustrated in FIG. 5, a general DSP-dedicated circuit has a configuration in which an adder 302 (or a subtractor) is disposed at a subsequent stage of a multiplier 300. In an example of FIG. 5, an operation value obtained by summing the products is stored in a register, and addition is repeated for the operation value. In complex multiplication circuit 100 illustrated in FIG. 1, multiply-subtract operation circuit 6 and multiply-accumulate operation circuit 7 have an adder and a subtractor disposed at a subsequent stage of the multiplier, and have the same circuit configuration as that of the DSP-dedicated circuit illustrated in FIG. 5. Thus, the general DSP-dedicated circuit can be applied to each of multiply-subtract operation circuit 6 and multiply-accumulate operation circuit 7. Therefore, complex multiplication circuit 100 can be easily mounted on the FPGA, and as a result, digital signal processing can be implemented in a low-cost FPGA device.

Third Embodiment

In the first embodiment, description has been made of a configuration example of the complex multiplication circuit that receives inputs of the first complex number and the second complex number and outputs a value obtained by multiplying the two complex numbers.

In a third embodiment, description will be made of a configuration example of a complex multiplication circuit capable of selectively executing an operation (complex multiplication) of outputting a value obtained by multiplying the two complex numbers and an operation of outputting a value obtained by multiplying a complex conjugate of the first complex number and the second complex number (complex conjugate multiplication).

<Configuration of Complex Multiplication Circuit>

Figure 6:
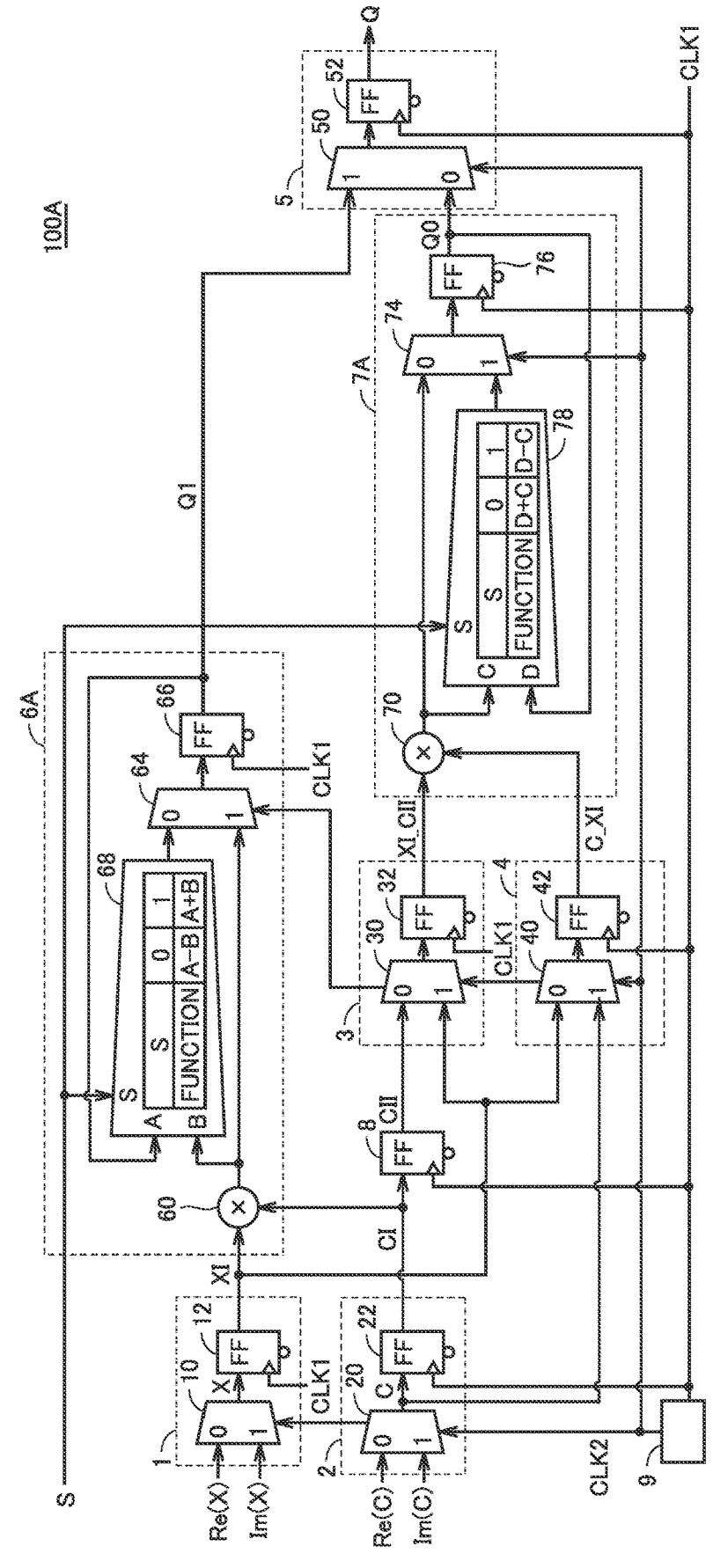
FIG. 6 is a diagram illustrating a configuration of a complex multiplication circuit according to a third embodiment.

FIG. 6 is a diagram illustrating a configuration of a complex multiplication circuit according to the third embodiment.

As illustrated in FIG. 6, a complex multiplication circuit 100A according to the third embodiment receives inputs of first input signal X and second input signal C, similarly to complex multiplication circuit 100. First input signal X is a complex number and is represented by real part Re(X) and imaginary part Im(X) as $X=Re(X)+Im(X)i$. First input signal X changes in the order of X0, X1, X2, . . . at a predetermined cycle at a cycle set in advance. Second input signal C is a complex number and is represented by a real part Re(C) and an imaginary part Im(C) as $C=Re(C)+Im(C)i$. Second input signal C changes in the order of C0, C1, C2, . . . in synchronization with first input signal X.

Complex multiplication circuit 100A is configured to selectively execute an operation of multiplying first input signal X and second input signal C and outputting multiplication value XC as a signal Q (complex multiplication) and an operation of multiplying a complex conjugate X* of first input signal X and second input signal C and outputting a multiplication value X*C as signal Q (complex conjugate multiplication). Note that the symbol * represents a complex conjugate.

Complex multiplication circuit 100A receives a control signal S from a control circuit (not illustrated). The control signal S changes control signal S between two values of "0 (L level)" and "1 (H level)". "0" corresponds to a "first level", and "1" corresponds to a "second level". As described later, control signal S is a control signal for switching between the operation of outputting multiplication value XC and the operation of outputting multiplication value X*C in complex multiplication circuit 100A.

In a configuration example of FIG. 6, complex multiplication circuit 100A executes the operation of outputting multiplication value XC when control signal S is "0" and executes the operation of outputting multiplication value X*C when control signal S is "1". Instead of the configuration example of FIG. 6, complex multiplication circuit 100A may execute the operation of outputting multiplication value XC when control signal S is "1" and execute the operation of outputting multiplication value X*C when control signal S is "0".

As illustrated in FIG. 6, complex multiplication circuit 100A includes multiplex circuits 1 to 5, a multiply-subtract and multiply-accumulate operation circuit 6A, a multiply-accumulate and multiply-subtract operation circuit 7A, flip-flop 8, and clock generation circuit 9. Complex multiplication circuit 100A is different from complex multiplication circuit 100 illustrated in FIG. 1 in that complex multiplication circuit 100A includes multiply-subtract and multiply-accumulate operation circuit 6A and multiply-accumulate and multiply-subtract operation circuit 7A instead of multiply-subtract operation circuit 6 and multiply-accumulate operation circuit 7. Other configurations are the same as those of complex multiplication circuit 100, and thus the description thereof will not be repeated.

Multiply-subtract and multiply-accumulate operation circuit 6A receives multiplex signal XI from multiplex circuit 1, receives multiplex signal CI from multiplex circuit 2, and receives control signal S from the control circuit (not illustrated). Multiply-subtract and multiply-accumulate operation circuit 6A multiplies multiplex signal XI and multiplex signal CI in synchronization with first clock signal CLK1. When control signal S is "0", multiply-subtract and multiply-accumulate operation circuit 6A time-divisionally multiplexes a multiplication value B acquired in the current cycle and a value A−B obtained by subtracting multiplication value B from a multiplication value A acquired in the previous cycle, and outputs a multiplex signal Q1. That is, when control signal S is "0", multiply-subtract and multiply-accumulate operation circuit 6A operates as a multiply-subtract operation circuit.

On the other hand, when control signal S is "1", multiply-subtract and multiply-accumulate operation circuit 6A time-divisionally multiplexes multiplication value B acquired in the current cycle and value A−B obtained by subtracting multiplication value B from multiplication value A acquired in the previous cycle, and outputs multiplex signal Q1. That is, when control signal S is "1", multiply-subtract and multiply-accumulate operation circuit 6A operates as a multiply-accumulate operation circuit.

Specifically, multiply-subtract and multiply-accumulate operation circuit 6A includes multiplier 60, subtractor-adder 68, selector 64, and flip-flop 66. Multiplier 60 multiplies multiplex signal XI and multiplex signal CI and outputs multiplication value B ($=CI \cdot XI$). Output signal B of multiplier 60 is input to subtractor-adder 68 and selector 64.

Subtractor-adder 68 receives output signal B of multiplier 60 and output signal A and control signal S of flip-flop 66. When control signal S is "0", subtractor-adder 68 subtracts output signal B from output signal A and outputs subtraction value A−B. Output signal A−B of subtractor-adder 68 is input to selector 64. On the other hand, when control signal S is "1", subtractor-adder 68 adds output signal B and output signal B and outputs addition value A+B. Output signal A+B of subtractor-adder 68 is input to selector 64. Subtractor-adder 68 corresponds to an example of a "subtractor-adder".

Selector 64 receives output signal B of multiplier 60 and output signal (subtraction value A−B or addition value A+B) of subtractor-adder 68. Selector 64 time-divisionally multiplexes these two input signals in accordance with the logic of second clock signal CLK2 and outputs a multiplex signal. Specifically, selector 64 outputs output signal B of multiplier 60 at a timing of a rise of second clock signal CLK2 and outputs the output signal of subtractor-adder 68 at a timing of a fall of second clock signal CLK2. That is, multiplication value B and subtraction value A−B (or addition value A+B) alternately appear in the multiplex signal output from selector 64 at the same cycle as first clock signal CLK1. Flip-flop 66 is a D flip-flop, delays the input signal (output signal of selector 64) by one cycle of first clock signal CLK1, and outputs multiplex signal Q1.

Multiply-accumulate and multiply-subtract operation circuit 7A receives multiplex signal XI_CII from multiplex circuit 3, receives multiplex signal C_XI from multiplex circuit 4, and receives control signal S from the control circuit (not illustrated). Multiply-accumulate and multiply-subtract operation circuit 7A multiplies multiplex signal XI_CII and multiplex signal C_XI in synchronization with first clock signal CLK1. When control signal S is "0", multiply-accumulate and multiply-subtract operation circuit 7A time-divisionally multiplexes multiplication value C acquired in the current cycle and value C+D obtained by adding multiplication value D and multiplication value C acquired in the previous cycle, and outputs multiplex signal Q0. That is, when control signal S is "0", multiply-accumulate and multiply-subtract operation circuit 7A operates as a multiply-accumulate operation circuit.

On the other hand, when control signal S is "1", multiply-accumulate and multiply-subtract operation circuit 7A time-divisionally multiplexes multiplication value C acquired in the current cycle and a value D−C obtained by subtracting multiplication value C from a multiplication value D acquired in the previous cycle, and outputs a multiplex signal Q0. That is, when control signal S is "1", multiply-accumulate and multiply-subtract operation circuit 7A operates as a multiply-subtract operation circuit.

Specifically, multiply-accumulate and multiply-subtract operation circuit 7A includes multiplier 70, an adder-subtractor 78, selector 74, and flip-flop 76. Multiplier 70 multiplies multiplex signal XI_CII and multiplex signal C_XI and outputs multiplication value C (=XI_CII·C_XI). Output signal C of multiplier 70 is input to adder-subtractor 78 and selector 74.

Adder-subtractor 78 receives output signal C of multiplier 70 and output signal D and control signal S of flip-flop 76. When control signal S is "0", adder-subtractor 78 adds output signal C and output signal D and outputs addition value C+D. Output signal C+D of adder-subtractor 78 is input to selector 74. On the other hand, when the control signal S is "1", adder-subtractor 78 subtracts output signal C from output signal D and outputs subtraction value D−C. Output signal D−C of adder-subtractor 78 is input to selector 74. Adder-subtractor 78 corresponds to an example of an "adder-subtractor".

Selector 74 receives an input of output signal C of multiplier 70 and the output signal (addition value C+D or subtraction value D−C) of adder-subtractor 78. Selector 74 time-divisionally multiplexes these two input signals in accordance with the logic of second clock signal CLK2 and outputs a multiplex signal. Specifically, selector 74 outputs the output signal of adder-subtractor 78 at a timing of a rise of second clock signal CLK2 and outputs output signal C of multiplier 70 at a timing of a fall of second clock signal CLK2. That is, an addition value C+D (or subtraction value D−C) and multiplication value C alternately appear in the multiplex signal output from selector 74 at the same cycle as first clock signal CLK1. Flip-flop 76 is a D flip-flop, delays the input signal (output signal of selector 74) by one cycle of first clock signal CLK1, and outputs multiplex signal Q0.

Multiplex circuit 5 receives multiplex signal Q1 from multiply-subtract and multiply-accumulate operation circuit 6A and receives multiplex signal Q0 from multiply-accumulate and multiply-subtract operation circuit 7A. Multiplex circuit 5 time-divisionally multiplexes input multiplex signal Q1 and multiplex signal Q0 and outputs a multiplex signal Q.

<Operation of Complex Multiplication Circuit>

Next, description will be made of an operation of complex multiplication circuit 100A according to the third embodiment. As described above, when control signal S is "0", complex multiplication circuit 100A executes the operation (complex multiplication) of outputting multiplication value XC of complex number X and complex number C. When control signal S is "1", complex multiplication circuit 100A executes the operation of outputting multiplication value X*C of complex conjugate X* of complex number X and complex number C (complex conjugate multiplication).

Figure 7:
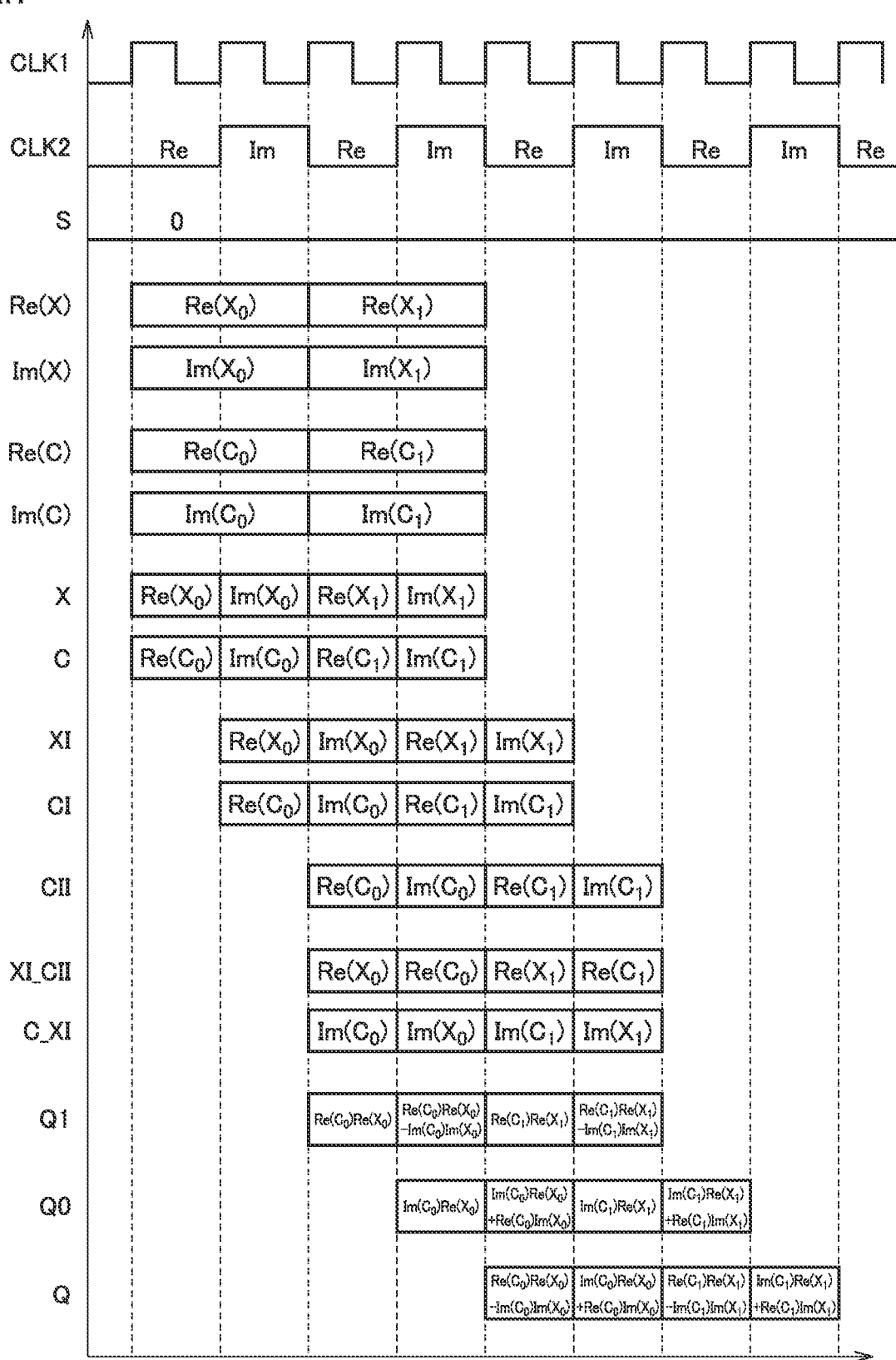
FIG. 7 is a time chart illustrating an operation of the complex multiplication circuit illustrated in FIG. 6.

FIG. 7 is a time chart illustrating the operation of complex multiplication circuit 100A illustrated in FIG. 6. The time chart illustrated in FIG. 7 illustrates the operation of complex multiplication circuit 100A when control signal S is "0".

FIG. 7 illustrates, in order from the top, waveforms of first clock signal CLK1, second clock signal CLK2, control signal S, real part Re(X) and imaginary part Im(X) of first input signal X, and real part Re(C) and imaginary part Im(C) of second input signal C. FIG. 7 also illustrates waveforms of multiplex signal X and multiplex signal XI generated in multiplex circuit 1, multiplex signal C and multiplex signal CI generated in multiplex circuit 2, multiplex signal CII generated in flip-flop 8, multiplex signal XI_CII generated in multiplex circuit 3, and multiplex signal C_XI generated in multiplex circuit 4. FIG. 7 further illustrates waveforms of multiplex signal Q1 generated by multiply-subtract and multiply-accumulate operation circuit 6A, multiplex signal Q0 generated by multiply-accumulate and multiply-subtract operation circuit 7A, and multiplex signal Q generated by multiplex circuit 5.

In the time chart illustrated in FIG. 7, the waveforms of first clock signal CLK1, second clock signal CLK2, real part Re(X) and imaginary part Im(X) of first input signal X, real part Re(C) and imaginary part Im(C) of second input signal C, multiplex signal X and multiplex signal XI, multiplex signal C and multiplex signal CI, multiplex signal CII, multiplex signal XI_CII, and multiplex signal C_XI are the same as the waveforms of these signals in the time chart illustrated in FIG. 2.

When control signal S is "0", multiplex signal Q1 and multiplex signal Q0 are the same as multiplex signal Q0 and multiplex signal Q1 illustrated in FIGS. 2 and 3, respectively. Therefore, multiplex signal Q is also the same as multiplex signal Q illustrated in FIGS. 2 and 3. That is, multiplex signal Q is a multiplex signal obtained by time-divisionally multiplexing the real part and the imaginary part of multiplication value XC of complex number X and complex number C.

Figure 8:
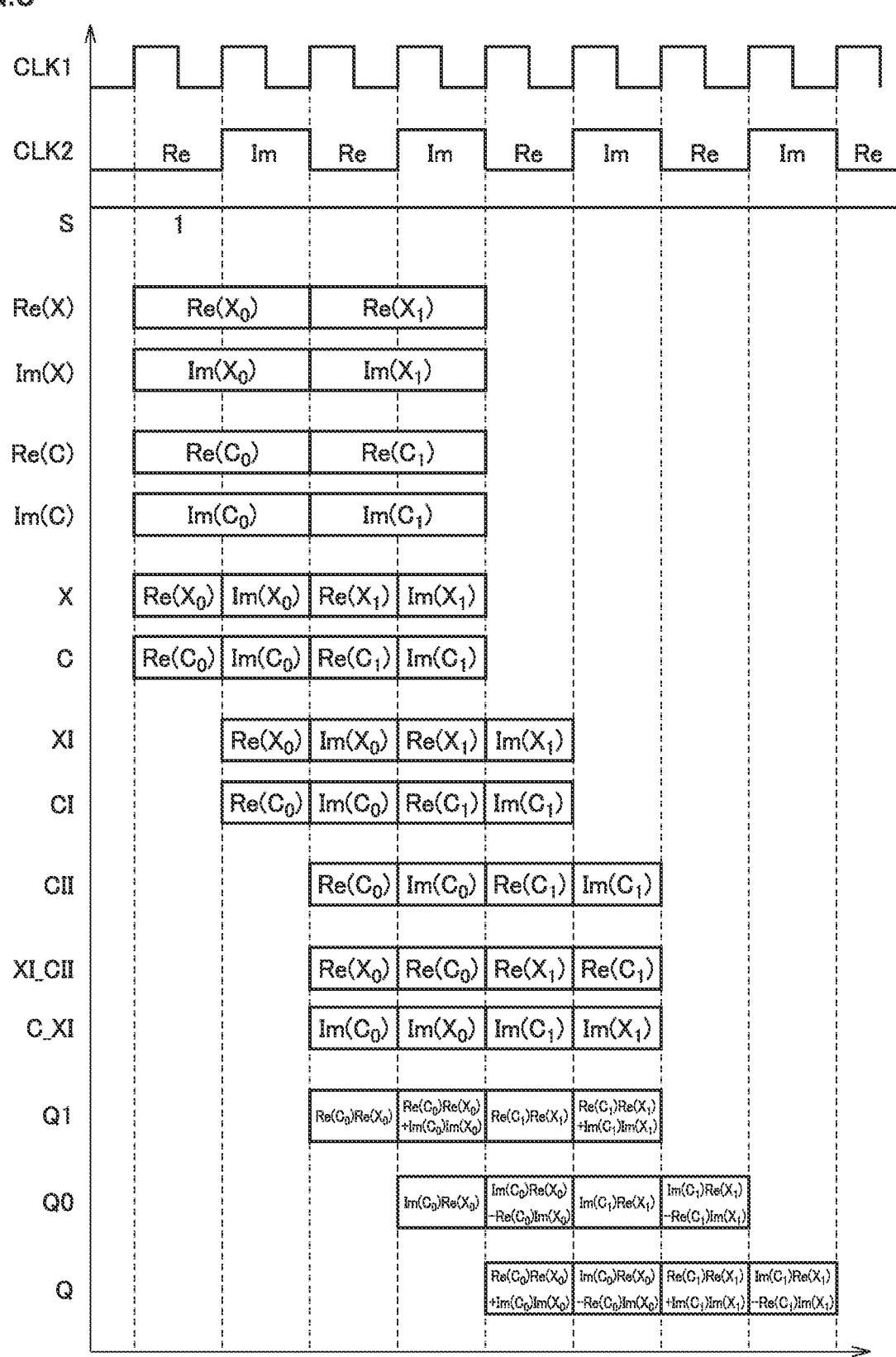
FIG. 8 is a time chart illustrating an operation of the complex multiplication circuit illustrated in FIG. 6.
Figure 9:
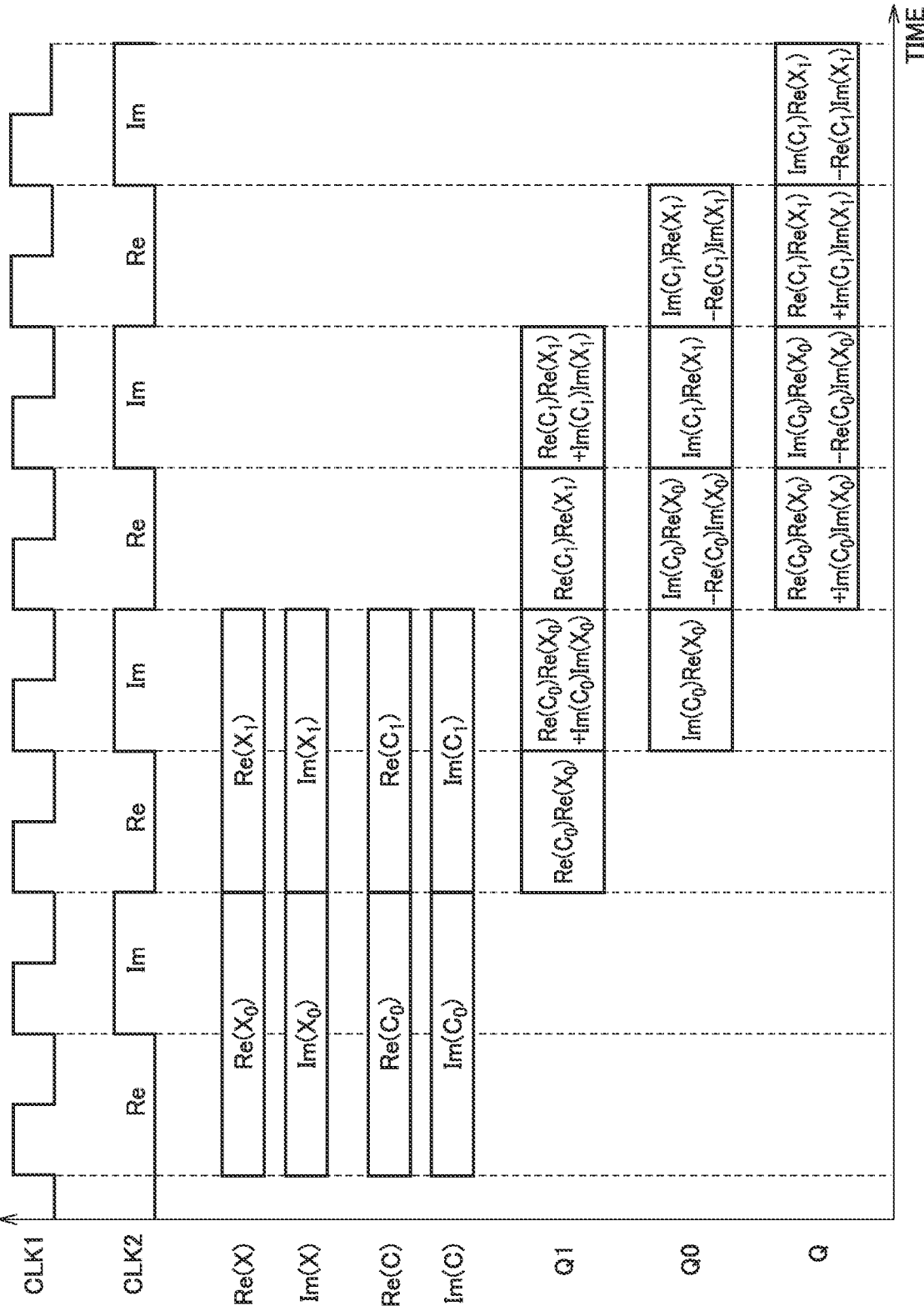
FIG. 9 is a time chart illustrating an operation of the complex multiplication circuit illustrated in FIG. 6.

FIGS. 8 and 9 are time charts illustrating the operation of complex multiplication circuit 100A illustrated in FIG. 6.

The time charts illustrated in FIGS. 8 and 9 illustrate the operation of complex multiplication circuit 100A when control signal S is "1".

Similarly to FIG. 7, FIG. 8 illustrates, in order from the top, the waveforms of first clock signal CLK1, second clock signal CLK2, control signal S, real part Re(X) and imaginary part Im(X) of first input signal X, real part Re(C) and imaginary part Im(C) of second input signal C, multiplex signal X and multiplex signal XI, multiplex signal C and multiplex signal CI, multiplex signal CII, multiplex signal XI_CII, and multiplex signal C_XI. FIG. 8 further illustrates waveforms of multiplex signal Q1 generated by multiply-subtract and multiply-accumulate operation circuit 6A, multiplex signal Q0 generated by multiply-accumulate and multiply-subtract operation circuit 7A, and multiplex signal Q generated by multiplex circuit 5.

FIG. 9 illustrates waveforms of clock signals CLK1 and CLK2, real part Re(X) and imaginary part Im(X) of first input signal X, real part Re(C) and imaginary part Im(C) of second input signal C, and multiplex signals Q1, Q0, and Q extracted from the time chart in FIG. 8.

In the time chart illustrated in FIG. 8, the waveforms of first clock signal CLK1, second clock signal CLK2, real part Re(X) and imaginary part Im(X) of first input signal X, real part Re(C) and imaginary part Im(C) of second input signal C, multiplex signal X and multiplex signal XI, multiplex signal C and multiplex signal CI, multiplex signal CII, multiplex signal XI_CII, and multiplex signal C_XI are the same as the waveforms of these signals in the time chart illustrated in FIG. 7.

When control signal S is "1", in multiply-subtract and multiply-accumulate operation circuit 6A, multiplier 60 multiplies multiplex signal XI and multiplex signal CI in synchronization with first clock signal CLK1. In multiplication value B of multiplier 60, a multiplication value of real part Re(X) and real part Re(C) and a multiplication value of imaginary part Im(X) and imaginary part Im(C) alternately appear in synchronization with first clock signal CLK1. Subtractor-adder 68 adds multiplication value A acquired in the previous cycle and multiplication value B acquired in the current cycle.

Selector 64 outputs multiplication value B of multiplier 60 at a timing of a rise of second clock signal CLK2 and outputs addition value A+B of subtractor-adder 68 at a timing of a fall of second clock signal CLK2. Multiplication value B and addition value A+B alternately appear in the multiplex signal output from selector 64 at the same cycle as first clock signal CLK1. Flip-flop 66 outputs multiplex signal Q1 obtained by delaying the input signal (output signal of selector 64) by one cycle of first clock signal CLK1.

As illustrated in FIGS. 8 and 9, multiplex signal Q1 changes in the order of multiplication value [Re(C0) Re(X0)] of real part Re(C0) and real part Re(X0), a value {Re(C0) Re(X0)+Im(C0) Im(X0)} obtained by adding multiplication value [Im(C0) Im(I0)] of imaginary part Im(C0) and imaginary part Im(X0) to multiplication value [Re(C0) Re(X0)], multiplication value [Re(C1) Re(X1)] of real part Re(X1) and real part Re(C1), a value {[Re(C1) Re(X1)]+ Im(C1) Im(X1)} obtained by adding multiplication value [Im(X1) Im(C1)] of imaginary part Im(C1) and imaginary part Im(C1) to multiplication value [Re(C1) Re(X1)], . . . in synchronization with first clock signal CLK1. That is, multiplex signal Q1 is a multiplex signal obtained by time-divisionally multiplexing multiplication value [Re(C) Re(X)] of real part Re(C) and real part Re(X) and a value {Re(C) Re(X)+Im(C) Im(X)} obtained by adding the multiplication value of imaginary part Im(C) and imaginary part Im(X) to the multiplication value of real part Re(C) and real part Re(X).

Multiply-accumulate and multiply-subtract operation circuit 7A receives inputs of multiplex signal XI_CII and multiplex signal C_XI. As described above, multiplex signal XI_CII is a multiplex signal obtained by time-divisionally multiplexing real part Re(X) of first input signal X and real part Re(C) of second input signal C. Multiplex signal C_XI is a multiplex signal obtained by time-divisionally multiplexing imaginary part Im(C) of second input signal C and imaginary part Im(X) of first input signal X.

In multiply-accumulate and multiply-subtract operation circuit 7A, multiplier 70 multiplies multiplex signal XI_CII and multiplex signal C_XI in synchronization with first clock signal CLK1. In multiplication value C of multiplier 70, a multiplication value of imaginary part Im(C) and real part Re(X) and a multiplication value of real part Re(C) and imaginary part Im(X) alternately appear in synchronization with first clock signal CLK1. Adder-subtractor 78 subtracts multiplication value C acquired in the current cycle from multiplication value D acquired in the previous cycle.

Selector 74 outputs multiplication value C of multiplier 70 at a timing of a fall of second clock signal CLK2 and outputs subtraction value D−C at a timing of a rise of second clock signal CLK2. Multiplication value C and subtraction value D−C alternately appear in the multiplex signal output from selector 74 at the same cycle as first clock signal CLK1. Flip-flop 76 outputs multiplex signal Q0 obtained by delaying the input signal (output signal of selector 74) by one cycle of first clock signal CLK1.

As illustrated in FIGS. 8 and 9, multiplex signal Q0 changes in the order of multiplication value [Im(C0) Re(X0)] of imaginary part Im(C0) and real part Re(X0), a value{Im(C0) Re(X0)−Re(C0) Im(X0)} obtained by subtracting multiplication value [Re(C0) Im(X0)] of real part Re(C0) and imaginary part Im(X0) from multiplication value [Im(C0) Re(X0)], multiplication value [Im(C1) Re(X1)] of imaginary part Im(C1) and real part Re(X1), a value {Im(C1) Re(X1)−Re(C1) Im(X1)} obtained by subtracting multiplication value [Re(C1) Im(X1)] of real part Re(C1) and imaginary part Im(X1) from multiplication value [Im(C1) Re(X1)], . . . in synchronization with first clock signal CLK1. That is, multiplex signal Q0 is a multiplex signal obtained by time-divisionally multiplexing a multiplication value [Im(C) Re(X)] of imaginary part Im(C) and real part Re(X) and a value {Im(C) Re(X)−Re(C) Im(X)} obtained by subtracting the multiplication value of real part Re(C) and imaginary part Im(X) from the multiplication value of imaginary part Im(C) and real part Re(X).

Note that multiplex signal Q0 is delayed from multiplex signal Q1 by one cycle of first clock signal CLK1. This is because multiplex signals XI_CII and C_XI input to multiply-accumulate and multiply-subtract operation circuit 7A are delayed from multiplex signals XI and CI input to multiply-subtract and multiply-accumulate operation circuit 6A by one cycle of first clock signal CLK1.

In multiplex circuit 5, upon receipt of inputs of multiplex signal Q1 and multiplex signal Q0, selector 50 outputs multiplex signal Q0 at a timing of a fall of second clock signal CLK2 and outputs multiplex signal Q1 at a timing of a rise of second clock signal CLK2. Thus, multiplex signal Q1 and multiplex signal Q0 alternately appear in the multiplex signal output from selector 50 in synchronization with first clock signal CLK1. Flip-flop 52 outputs multiplex signal Q obtained by delaying the output signal of selector 50 by one cycle of first clock signal CLK1. As illustrated in FIGS. 8 and 9, multiplex signal Q changes in the order of multiplex signal Q1 (=addition value {Re(C0) Re(X0)+Im (C0) Im(X0)}), multiplex signal Q0 (=subtraction value {Im(C0) Re(X0)–Re(C0) Im(X0)}), multiplex signal Q1 (=addition value {Re(C1) Re(X1)+Im(C1) Im(X1)}), and multiplex signal Q0 (=subtraction value {Im(C1) Re(X1)– Re(C1) Im(X1)}), . . . in synchronization with first clock signal CLK1. That is, multiplex signal Q is a multiplex signal obtained by time-divisionally multiplexing the addition value {Re(C) Re(X)+Im(C) Im(X)} and the subtraction value {Im(C) Re(X)–Re(C) Im (X)}.

Here, when complex conjugate X* of complex number X and complex number C are represented as the following equations (4) and (5), respectively (i is an imaginary unit), multiplication value X*C of complex conjugate X* and complex number C is represented as the following equation (6).

$$X^*=\mathrm{Re}(X)-\mathrm{Im}(X)i \quad (4)$$

$$C=\mathrm{Re}(C)+\mathrm{Im}(C)i \quad (5)$$

$$X^*C=\{\mathrm{Re}(X)\mathrm{Re}(C)+\mathrm{Im}(X)\mathrm{Im}(C)\}+\{\mathrm{Im}(C)\mathrm{Re}(X)-\mathrm{Re}(C)\mathrm{Im}(X)\}i \quad (6)$$

Comparing the right side of equation (6) with multiplex signal Q, the real part in the first term on the right side corresponds to the addition value in multiplex signal Q, and the imaginary part in the second term on the right side corresponds to the subtraction value in multiplex signal Q. That is, it can be seen that multiplex signal Q is a multiplex signal obtained by time-divisionally multiplexing the real part and the imaginary part of multiplication value X*C of complex conjugate X* and complex number C.

As described above, when control signal S is "1", the complex multiplication circuit according to the third embodiment is configured to convert each of two complex numbers X and C into multiplex signals XI and CI obtained by time-divisionally multiplexing the real part and the imaginary part, calculate two generated multiplex signals XI and CI, and output multiplex signal Q obtained by time-divisionally multiplexing the real part and the imaginary part as multiplication value X*C.

On the other hand, when control signal S is "0", the complex multiplication circuit according to the third embodiment is configured to output, as multiplication value XC, multiplex signal Q obtained by time-divisionally multiplexing the real part and the imaginary part, similarly to the complex multiplication circuit according to the first embodiment.

In this way, the complex multiplication circuit according to the third embodiment can selectively execute the operation of calculating multiplication value XC of complex number X and complex number C and the operation of calculating multiplication value X*C of complex conjugate X* of complex number X and complex number C in accordance with control signal S. In the above configuration, the circuit that calculates two multiplex signals XI and CI can include two multipliers 60 and 70, one subtractor-adder 68, and one adder-subtractor 78.

It should be understood that the embodiments disclosed herein are illustrative in all respects and not restrictive. The scope of the present disclosure is defined not by the above description but by the claims, and is intended to include meanings equivalent to the claims and all modifications within the scope.

REFERENCE SIGNS LIST

1, 2, 3, 4, 5: multiplex circuit, 6: multiply-subtract operation circuit, 6A: multiply-subtract and multiply-accumulate operation circuit, 7: multiply-accumulate operation circuit, 7A: multiply-accumulate and multiply-subtract operation circuit, 8: flip-flop, 9: clock generation circuit, 10, 20, 30, 40, 50, 64, 74: selector, 12, 22, 32, 42, 52, 66, 76: flip-flop, 60, 70: multiplier, 62: subtractor, 68: subtractor-adder, 72: adder, 78: adder-subtractor, 100, 100A: complex multiplication circuit, X, C: input signal (complex number), Q: output signal (complex multiplication value) CLK1: first clock signal, CLK2: second clock signal

The invention claimed is:

1. A complex multiplication circuit to multiply a first complex number and a second complex number, the first complex number having a first real part and a first imaginary part, the second complex number having a second real part and a second imaginary part, the complex multiplication circuit comprising:

a first multiplex circuit to generate a first multiplex signal obtained by time-divisionally multiplexing the first real part and the first imaginary part;

a second multiplex circuit to generate a second multiplex signal obtained by time-divisionally multiplexing the second real part and the second imaginary part;

a multiply-subtract operation circuit to perform a multiply-subtract operation of the first multiplex signal and the second multiplex signal;

a third multiplex circuit to generate a third multiplex signal obtained by time-divisionally multiplexing the first real part and the second real part;

a fourth multiplex circuit to generate a fourth multiplex signal obtained by time-divisionally multiplexing the second imaginary part and the first imaginary part;

a multiply-accumulate operation circuit to perform a multiply-accumulate operation of the third multiplex signal and the fourth multiplex signal; and a fifth multiplex circuit to generate a fifth multiplex signal obtained by time-divisionally multiplexing an output value of the multiply-subtract operation circuit and an output value of the multiply-accumulate operation circuit.

2. The complex multiplication circuit according to claim 1, wherein the multiply-subtract operation circuit time-divisionally multiplexes a multiplication value of the first real part and the second real part and a subtraction value obtained by subtracting a multiplication value of the first imaginary part and the second imaginary part from the multiplication value of the first real part and the second real part, and outputs a resulting value, the multiply-accumulate operation circuit time-divisionally multiplexes a multiplication value of the first real part and the second imaginary part and an addition value obtained by adding the multiplication value of the first real part and the second imaginary part and a multiplication value of the second real part and the first imaginary part, and outputs a resulting value, and the fifth multiplex circuit generates the fifth multiplex signal by time-divisionally multiplexing the subtraction value and the addition value.

3. The complex multiplication circuit according to claim 2, wherein the multiply-subtract operation circuit includes a first multiplier to multiply the first multiplex signal and the second multiplex signal, and a subtractor to subtract a multiplication value of the first multiplier in a current cycle from a multiplication value of the first multiplier in a previous cycle.

4. The complex multiplication circuit according to claim 2, wherein the multiply-accumulate operation circuit includes a second multiplier to multiply the third multiplex signal and the fourth multiplex signal, and an adder to add a multiplication value of the second multiplier in a current cycle and a multiplication value of the second multiplier in a previous cycle.

5. The complex multiplication circuit according to claim 1, further comprising a clock generation circuit to generate a second clock signal by dividing a frequency of a first clock signal having a frequency twice a frequency of the first complex number and the second complex number into two, wherein each of the first to fifth multiplex circuits, the multiply-subtract operation circuit, and the multiply-accumulate operation circuit includes a selector to time-divisionally multiplex two input signals in accordance with a logic of the second clock signal, and a flip-flop to output a signal obtained by delaying an output signal of the selector by one cycle of the first clock signal.

6. A complex multiplication circuit to selectively perform an operation of multiplying a first complex number and a second complex number and an operation of multiplying a complex conjugate of the first complex number and the second complex number in accordance with a control signal, the first complex number having a first real part and a first imaginary part, the second complex number having a second real part and a second imaginary part, the complex multiplication circuit comprising:

a first multiplex circuit to generate a first multiplex signal obtained by time-divisionally multiplexing the first real part and the first imaginary part;

a second multiplex circuit to generate a second multiplex signal obtained by time-divisionally multiplexing the second real part and the second imaginary part;

a multiply-subtract and multiply-accumulate operation circuit to perform a multiply-subtract operation of the first multiplex signal and the second multiplex signal when the control signal is at a first level and to perform a multiply-accumulate operation of the first multiplex signal and the second multiplex signal when the control signal is at a second level;

a third multiplex circuit to generate a third multiplex signal obtained by time-divisionally multiplexing the first real part and the second real part;

a fourth multiplex circuit to generate a fourth multiplex signal obtained by time-divisionally multiplexing the second imaginary part and the first imaginary part;

a multiply-accumulate and multiply-subtract operation circuit to perform a multiply-accumulate operation of the third multiplex signal and the fourth multiplex signal when the control signal is at the first level and to perform a multiply-subtract operation of the third multiplex signal and the fourth multiplex signal when the control signal is at the second level; and a fifth multiplex circuit to generate a fifth multiplex signal obtained by time-divisionally multiplexing an output value of the multiply-subtract and multiply-accumulate operation circuit and an output value of the multiply-accumulate and multiply-subtract operation circuit.

7. The complex multiplication circuit according to claim 6, wherein, the multiply-subtract and multiply-accumulate operation circuit:

time-divisionally multiplexes a multiplication value of the first real part and the second real part and a subtraction value obtained by subtracting a multiplication value of the first imaginary part and the second imaginary part from the multiplication value of the first real part and the second real part and outputs a resulting value when the control signal is at the first level, and time-divisionally multiplexes the multiplication value of the first real part and the second real part and an addition value obtained by adding the multiplication value of the first real part and the second real part and the multiplication value of the first imaginary part and the second imaginary part and outputs a resulting value when the control signal is at the second level, and the multiply-accumulate and multiply-subtract operation circuit:

time-divisionally multiplexes a multiplication value of the first real part and the second imaginary part and an addition value obtained by adding the multiplication value of the first real part and the second imaginary part and a multiplication value of the second real part and the first imaginary part and outputs a resulting value when the control signal is at the first level, and time-division multiplexes the multiplication value of the first real part and the second imaginary part and a subtraction value obtained by subtracting the multiplication value of the second real part and the first imaginary part from the multiplication value of the first real part and the second imaginary part and outputs a resulting value when the control signal is at the second level.

8. The complex multiplication circuit according to claim 7, wherein the multiply-subtract and multiply-accumulate operation circuit includes a first multiplier to multiply the first multiplex signal and the second multiplex signal, and a subtractor-adder to subtract a multiplication value of the first multiplier in a current cycle from a multiplication value of the first multiplier in a previous cycle when the control signal is at the first level, and to add the multiplication value of the first multiplier in the previous cycle and the multiplication value of the first multiplier in the current cycle when the control signal is at the second level.

9. The complex multiplication circuit according to claim 7, wherein the multiply-accumulate and multiply-subtract operation circuit includes a second multiplier to multiply the third multiplex signal and the fourth multiplex signal, and an adder-subtractor to add a multiplication value of the second multiplier in a previous cycle and a multiplication value of the second multiplier in a current cycle when the control signal is at the first level, and to subtract the multiplication value of the second multiplier in the current cycle from the multiplication value of the second multiplier in the previous cycle when the control signal is at the second level.

10. The complex multiplication circuit according to claim 6, further comprising a clock generation circuit to generate a second clock signal by dividing a frequency of a first clock signal having a frequency twice a frequency of the first complex number and the second complex number into two, wherein each of the first to fifth multiplex circuits, the multiply-subtract and multiply-accumulate operation circuit, and the multiply-accumulate and multiply-subtract operation circuit includes a selector to time-divisionally multiplex two input signals in accordance with a logic of the second clock signal, and a flip-flop to output a signal obtained by delaying an output signal of the selector by one cycle of the first clock signal.

\* \* \* \* \*